United States Patent [19]
Levitre

[11] Patent Number: 4,830,422
[45] Date of Patent: May 16, 1989

[54] ARRANGEMENT OF A SEAT ON THE FLOOR OF A MOTOR VEHICLE

[75] Inventor: Gilles Levitre, Gennevilliers, France

[73] Assignees: Automobiles Peugeot, Paris; Automobiles Citroen, Neuilly/Seine, both of France

[21] Appl. No.: 163,898

[22] Filed: Mar. 4, 1988

[30] Foreign Application Priority Data

Mar. 4, 1987 [FR] France .................. 87 02948

[51] Int. Cl.<sup>4</sup> ............................... B60N 1/02
[52] U.S. Cl. ...................... 296/65.1; 297/443; 248/429; 248/503.1; 248/544; 29/464; 29/525.1
[58] Field of Search ............. 296/65 R; 297/15, 443; 29/464, 526.1; 248/393, 429, 503.1, 544

[56] References Cited
U.S. PATENT DOCUMENTS 3,961,767 6/1976 Albrecht et al. ............ 248/503.1
4,094,489 6/1978 Yoshimura ................... 248/429
4,691,946 9/1987 Sburlati et al. .............. 248/429

FOREIGN PATENT DOCUMENTS 0112565 12/1983 European Pat. Off. .
0116279 1/1984 European Pat. Off. .
0171660 7/1985 European Pat. Off. .
1430930 11/1968 Fed. Rep. of Germany .... 296/65 R
799003 5/1936 France .
2329470 5/1977 France .
0053586 4/1977 Japan .................... 29/464

Primary Examiner—Dennis H. Pedder
Assistant Examiner—John M. Gruber
Attorney, Agent, or Firm—Burns, Doane, Swecker & Mathis

[57] ABSTRACT

The object of the invention is to enable a seat to be slidably mounted on the floor of a motor vehicle by robots. For this purpose, the seat is provided in the vicinity of a male hookup element (7) and a female hooking element (10, 13) with a guide element (11) having a bottom (14) and two divergent lateral walls (15). The bottom (14) and the adjacent part of the divergent walls (15) are located in the extension of the female element (10, 13) and ensure a correct positioning of the male element (7), even if the approach of the male element (7) resulting from the action of the robot is relatively unprecise.

7 Claims, 3 Drawing Sheets

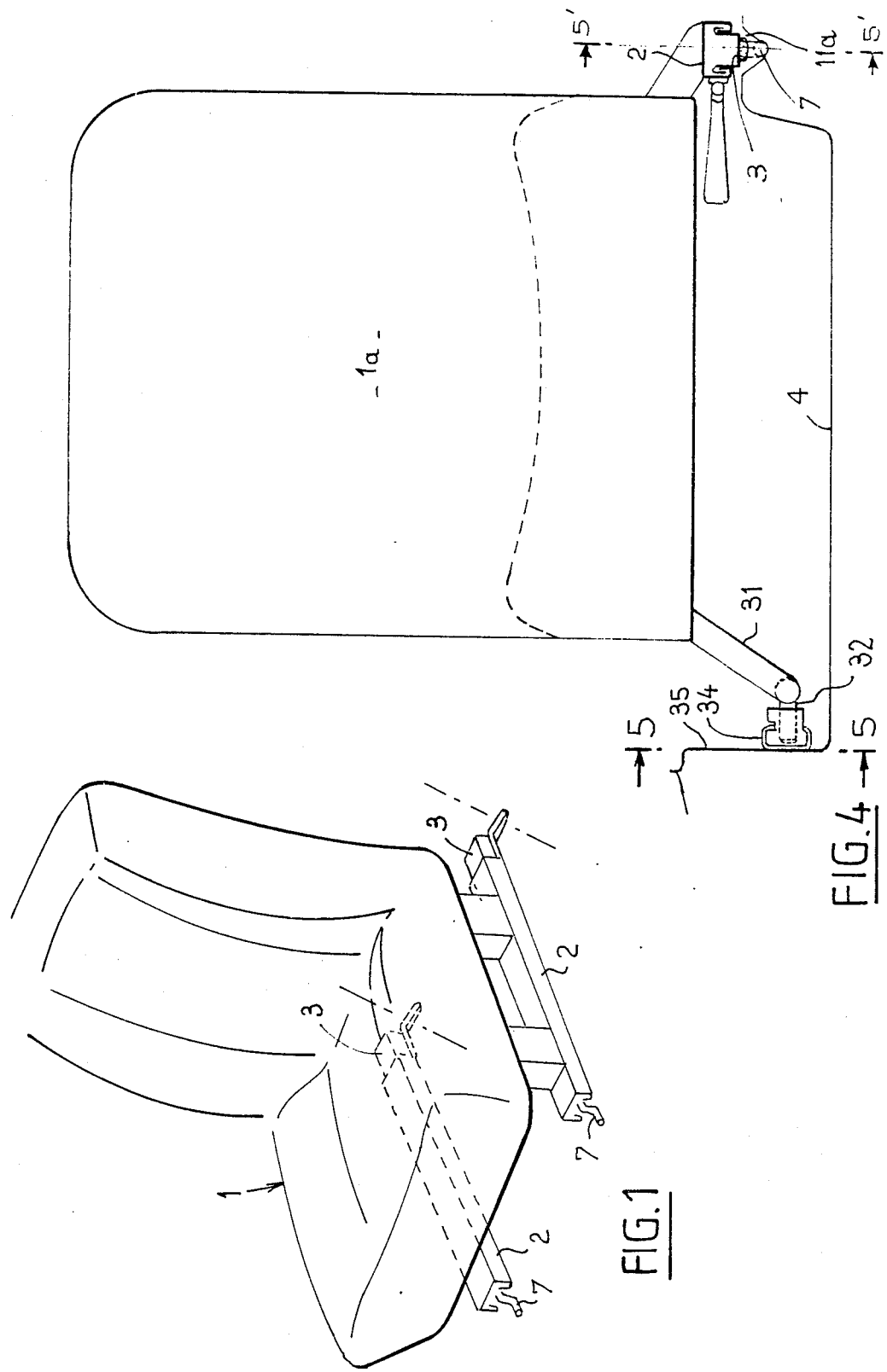

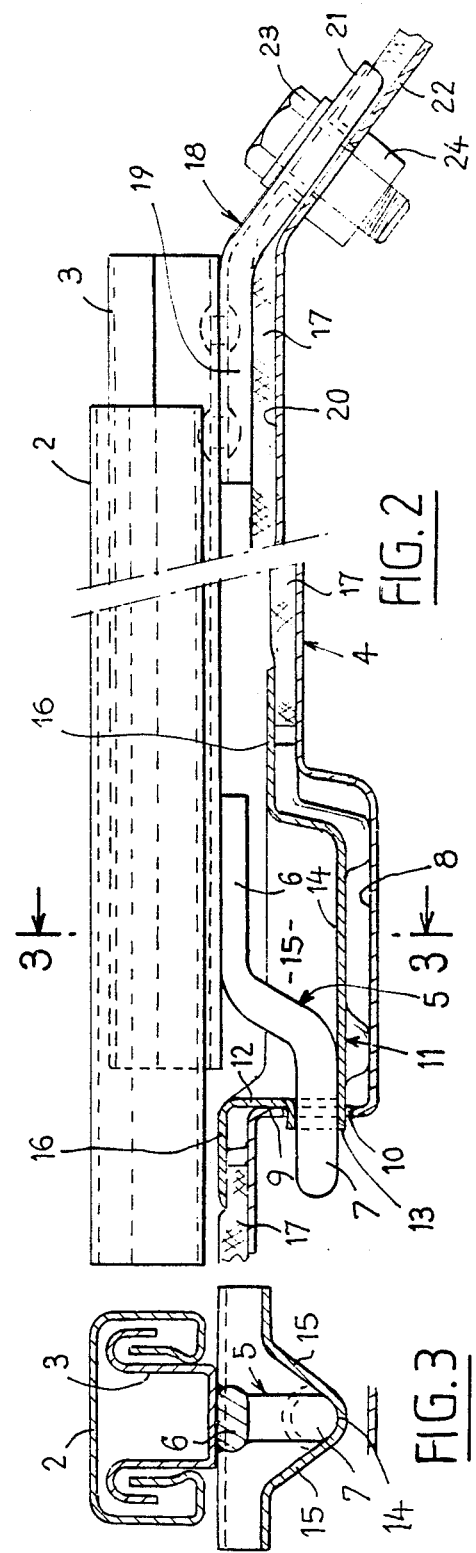
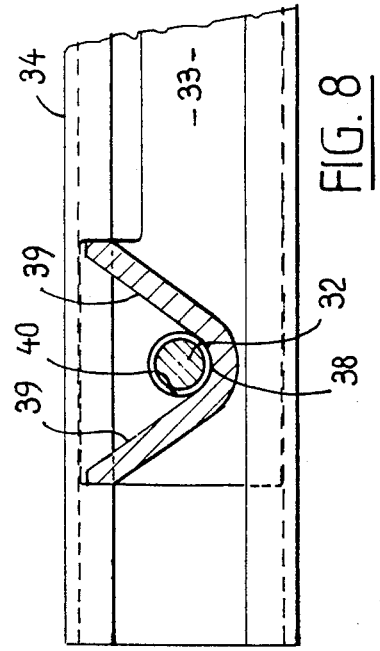
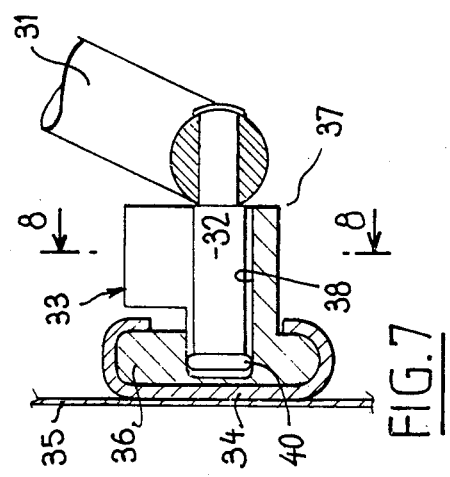

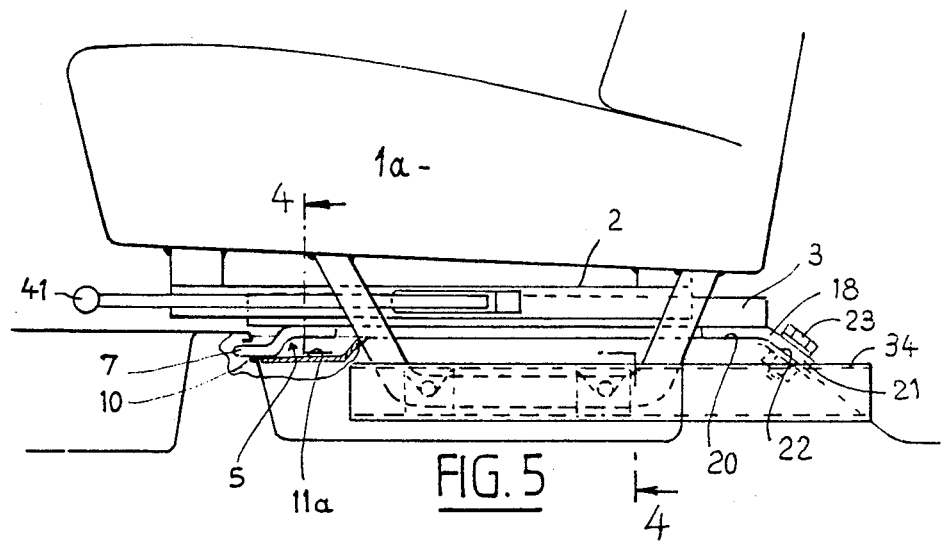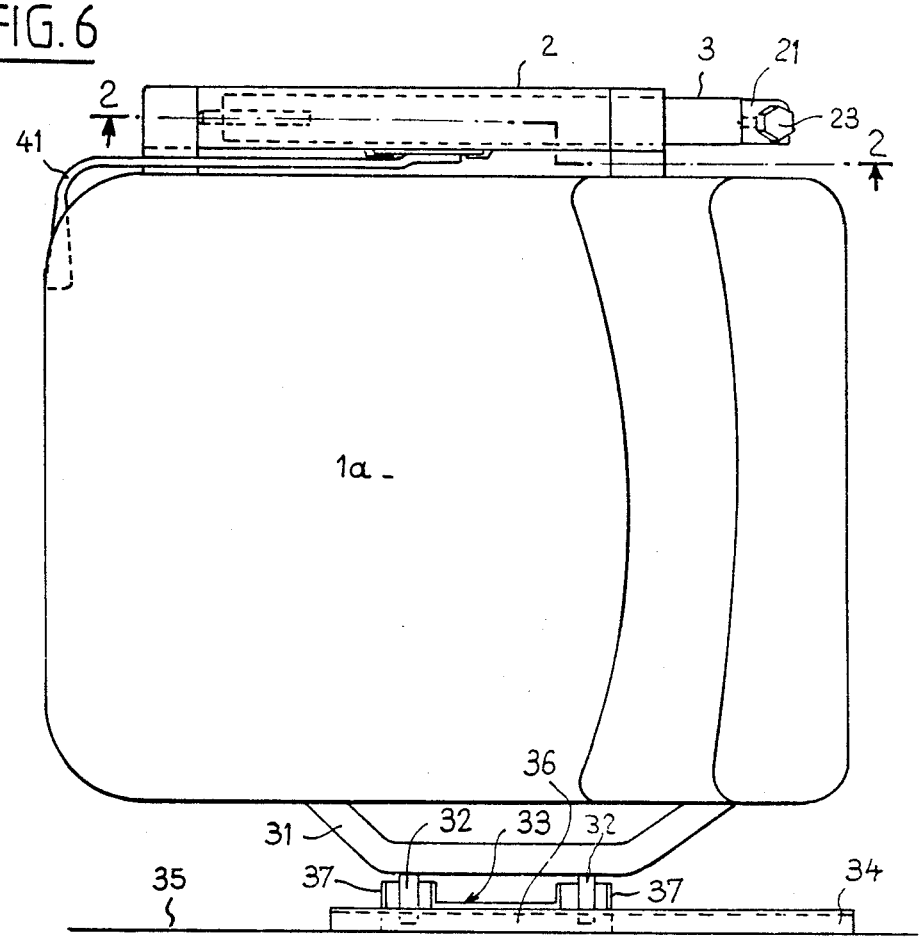

ARRANGEMENT OF A SEAT ON THE FLOOR OF A MOTOR VEHICLE

The present invention relates to motor vehicles, and more precisely to the manner in which the seats are mounted on the floor of these vehicles.

Generally, seats of motor vehicles and in particular the seats of the front passengers, are slidably mounted on two parallel rails fixed to the floor of the vehicle.

Various arrangements have been envisaged to permit a rapid mounting of the seat and the rails on the floor of the vehicle:

According to a first arrangement, the two rails each cooperate with a slide carried by the seat and are each fixed to the floor of the vehicle at one of their ends by a longitudinally engaged hooking means, and at their other end by immobilizing means. A longitudinally engaged hooking means is intended to mean a set of complementary male and female means, one of which is carried by the rail whereas the other is carried by the floor, the engagement or the disengagement of these two means being achieved by a relative displacement between the rail and the floor in the longitudinal direction of the rail.

With such an arrangement, each rail is previously engaged on or in the corresponding slide and it is then mounted and fixed to the floor by the aforementioned hooking and immboilizing means.

According to another arrangement, a first rail is provided with a slide carried by the seat and is fixed to the floor by a plurality of screws. A second rail is moreover provided which is hollow and laterally receives two sliding shoes connected to the seat.

The first rail is previously engaged in the slide carried by the seat and the hollow rail is fixed to the floor. The seat is mounted by laterally engaging the shoes in the hollow rail and then fixing the other rail to the floor by means of the screws.

These various devices all have a mounting difficulty since they require the precise alignment, depending on each case, of the hooking means, the immobilizing means, the shoes with the hollow rail and the screws with the tapped holes receiving the screws. Such a precision of alignment constitutes a practically unsurmountable obstacle to the mounting of the seat by a robot. This is a serious drawback in modern assembly lines in which robotization tends to be generalized.

An object of the invention is consequently to provide means whereby the mounting of a seat on the floor of a vehicle can be achieved without requiring a very fine precision in the alignment, so that this mounting can be carried out automatically, and in particular by robots.

The invention therefore provides the arrangement of a seat on the floor of a motor vehicle comprising at least one rail fixed to the floor, at least one slide fixed to the seat and cooperative with the rail, the rail being fixed to the floor, on one hand, by hooking means comprising complementary male and female elements respectively carried by the rail and the floor and engageable one inside the other or disengageable by a relative displacement in a direction substantially parallel to the longitudinal direction of the rail and, on the other hand, by immobilizing means, wherein the floor includes in the vicinity of said female element a guide element having a V cross-section shape including a bottom and two lateral walls which diverge toward the seat, said female element being disposed in the extension of the bottom and of the adjacent part of said lateral walls.

According to other features:

the guide element is directly defined in a recess in the floor which also defines an orifice constituting the female element;

the guide element is attached in the recess of the floor and includes a substantially vertical wall in which is provided a tubular guide which is engaged in an orifice in the floor and receives the male element;

the rail includes at its rear end with respect to the direction of movement of the rail corresponding to the engagement of the hooking means, a bearing surface on a substantially horizontal surface of the floor and an inclined surface adapted to abut against an inclined surface of the floor;

the seat has at least two lateral pins extending in a direction perpendicular to the longitudinal direction of the slide and the rail, these two pins being slidably mounted by means of a shoe in a rail and the shoe includes a cavity for each lateral pin and defines in the immediate vicinity of this cavity a divergent guide region including a bottom and two walls, the cavity being located in the extension of the bottom and the adjacent part of the walls.

The invention will be described in more detail hereinafter with reference to the accompanying drawings which are given solely by way of example and in which:

FIG. 1 is a diagrammatic view in perspective of a first embodiment of a seat provided with rails which are to be secured to the floor of a vehicle;

FIG. 2 is a partial longitudinal sectional view on line 2—2 of FIG. 6, to an enlarged scale, of means for fixing a rail to the floor of the vehicle;

FIG. 3 is a sectional view taken on line 3—3 of FIG. 2;

FIG. 4 is an elevational view of the rear of a modification of the arrangement of a seat on the floor of the vehicle, with a partial sectional view taken on line 4—4 of FIG. 5;

FIG. 5 is a sectional view taken on line 5—5 and partly on line 5'—5' of FIG. 4;

FIG. 6 is a top plan view of the arrangement shown in FIG. 4;

FIG. 7 is a cross-sectional view of an arrangement employed in the embodiment shown in FIGS. 4 to 6, and FIG. 8 is a sectional view taken on line 8—8 of FIG. 7.

FIG. 1 is a diagrammatic view of a vehicle seat 1 carrying in its lower part slides 2 which are movable along two rails 3, each of these rails being mounted and secured on the floor 4 of the vehicle by hooking and fixing means represented in more detail in FIGS. 2 and 3. A conventional mechanism, not shown, is of course provided for immobilizing the slides with respect to the rail in the position chosen by the user.

The hooking means between a rail 3 and the floor 4 of the vehicle comprise respectively male and female complementary elements. The male element is constituted by a lug 5 fixed to the rail, for example to the lower front part of the latter, this lug extending in a direction parallel to the longitudinal direction of the rail. In the illustrated embodiment, this lug has a flattened S shape and is welded to the rail by a branch 6 of its two branches, whereas its other branch 7 constitutes its active part which cooperates with the female element.

The latter is constituted by a recess 8 in the floor comprising a substantially vertical front wall 9 in which an orifice 10 is provided (FIG. 2). Received in the recess 8 is an attached member 11 defining a cup having a V-shaped cross-section (FIG. 3) and a length in the longitudinal direction of the rail 3 which exceeds the length of the lug 7. The member 11 includes a substantially vertical front wall 12 in which is provided a tubular guide 13 fitted in the orifice 10. This guide performs a double function: it maintains the member 11 relative to the floor and it receives the lug 7. The member 11 further comprises a bottom 14 and two lateral walls 15 which are divergent in a direction toward the seat. The tubular guide 13 is located in the extension of the bottom 14 and the lower parts of the lateral walls 15.

The attached member moreover bears by flanges 16 on the floor which is covered in the conventional manner by a trimming cover 17. The rail carries at its rear end opposed to the end on which the lug 5 is fixed a tab 18 fixed, for example by rivets, this tab comprising a portion 19 parallel to the rail which bears on a side 20 of the floor parallel to the bottom of the cup and covered with the covering 17, and a downwardly bent portion 21 which acts as an abutment by bearing against a surface 22 of the floor which is inclined relative to the direction of the lug. The rail is fixed to the floor, for example by a screw 23 which extends through the tab and cooperates with a nut 24 welded under the surface 22 of the floor.

FIGS. 4 to 6 show an arrangement which is different from that of FIG. 1, in which a seat 1a is supported on the floor of the vehicle, on one hand, by a device similar to that shown in FIGS. 2 and 3, and, in the other hand, by a device such as that shown in FIGS. 7 and 8. However, it will be observed that the attached member 11 of FIGS. 2 and 3 is eliminated and that the cup 11a ensuring the guiding of the lug 5 is directly defined in the floor in the immediate vicinity of the orifice 10 in which the active portion 7 of the lug is directly engaged.

The seat 1a further comprises a reinforcing element 31 provided with two lateral pins 32 guided by means of a shoe 33 in a laterally open hollow rail 34 fixed to a substantially vertical part 35 of the floor of the vehicle.

The hollow rail 34 therefore has a C-shaped section and the shoe 33 includes an inner portion 36 which slides in the rail and which has consequently a shape complementary to the inner cross-section shape of the rail. This shoe includes two outer portions 37 which project outside the rail and are divergent in an upward direction or in a direction toward the seat. Each of these divergent structures is defined by a bottom 38 and two inclined lateral surfaces 39 (FIGS. 7 and 8).

In the extension of this bottom and the lower part of the lateral surfaces, there is provided in the inner part of the shoe a cavity 40 whose shape is complementary to that of the pins 32.

Furthermore, a device for adjusting and immobilizing the slide 2 relative to the rail 3 is also provided; this device, actuated by a control lever 41, is seen in FIGS. 4, 5 and 6. It may be considered to be conventional and therefore has not been shown in more detail.

A seat arranged in accordance with FIGS. 1 to 13 is mounted in the following manner:

This seat is first of all provided with two assemblies comprising a slide 2 and a rail 3, each rail being adapted to cooperate with a part of the floor arranged for example as shown in FIGS. 2 and 3. The seat is mounted by engaging the two lugs 7 in their respective cup 11 by placing the opposed end portion of the rail, i.e. the portion 19 of the tab 18, on the surface 20 of the floor, then by causing the assembly to slide longitudinally so as to engage each lug 7 in the associated guide or cavity 13 until each abutment constituted by the bent portion 21 of the tab 18 comes to bear against the corresponding surface 22 of the floor. The last operation comprises the tightening of the two screws 33 to fix the rails on the floor.

In the embodiment shown in FIGS. 4 to 6, the seat is provided on one side with an assembly of a slide and a rail similar to those with which the seat of FIG. 1 is provided and includes on the other side two pins 32 which extend transversely relative to the longitudinal direction of the rail.

With the lateral rail 34 provided with the shoe 33 previously fixed to the floor, the seat is mounted by transversely engaging the two pins 32 in the appropriate cavities of the shoe 33, this engagement being facilitated by the presence of the divergent portions 38, 39.

The lug 7 is then placed on the bottom of the cup 11a, and the tab 18 is placed on the surface 20 of the floor, and then, as already explained with reference to the seat of FIG. 1, the assembly is caused to slide longitudinally so as to engage the lug 7 in the orifice 10 until the abutment 21 bears against the surface 22 of the floor. The screw 23 is then screwed home.

It is clear from the foregoing, that, when assembling, the approach of the various connecting means is facilitated by the arrangement of the inclined surface provided either directly in the floor (FIG. 4) or in an attached cup (FIG. 2), or in a shoe (FIG. 8), the divergence of these surfaces inclined toward the seat permitting an automatic centering of a longitudinal lug or the transverse pins relative to the cavities receiving them. The seat may therefore be mounted by robots capable of placing the seat with a relative precision so that the lugs and pins are located above the associated inclined surfaces. The approach of the abutment 21 relative to the surface 22 of the floor occurs at the required height owing to the bearing of the rail on the upper surface 20 of the floor through the tab 19.

Of the two embodiments illustrated on one hand in FIG. 1 and on the other hand in FIGS. 4 to 6, the second embodiment may be preferred since it only requires a single fixing screw.

I claim:

1. An arrangement of a seat on a motor vehicle floor, said arrangement comprising at least one rail extending in a longitudinal direction, at least one slide fixed to the seat and cooperative with the rail, hooking means for fixing the rail to the floor and comprising complementary male and female elements respectively carried by the rail and the floor and selectively engageable one inside the other, and disengageable from each other by a relative displacement in a direction substantially parallel to the longitundinal direction of the rail, and immobilizing means, the floor including in the vicinity of said female element a guide element having a V-shaped cross-section including a bottom and two lateral walls which diverge upwardly and in a direction generally perpendicular to the longitudinal axis of the rail, said female element being disposed along and in an extension of the bottom and part of said lateral walls of said V-shaped guide element.

2. An arrangement according to claim 1, wherein the guide element is directly defined in a recess of the floor which also defines an orifice constituting the female element.

3. An arrangement according to claim 1, wherein the guide element is attached in a recess of the floor and includes a substantially vertical wall in which is provided a tubular guide which is engaged in an orifice in the floor and receives the male element.

4. An arrangement according to claim 1, wherein the rail comprises at a rear end thereof, with respect to the direction of displacement of the rail corresponding to the engagement of said hooking means, a bearing surface comprised of a horizontal and inclined surface adapted to abut a horizontal and inclined surface of the floor.

5. An arrangement according to claim 4, comprising fixing means between said two inclined surfaces.

6. An arrangement according to claim 4, wherein the rail carries at a rear end thereof a tab which defines said bearing and inclined surfaces.

7. An arrangement of a seat on a motor vehicle floor, said arrangement comprising at least one rail extending in a longitudinal direction, at least one slide fixed to the seat and cooperative with the rail, hooking means for fixing the rail to the floor and comprising complementary male and female elements respectively carried by the rail and the floor and selectively engageable one inside the other, and disengageable from each other by a relative displacement in a direction substantially parallel to the longitudinal direction of the rail, and immobilizing means, the floor including in the vicinity of said female element a guide element having a V-shaped cross-section including a bottom and two lateral walls which diverge upwardly and in a direction generally perpendicular to the longitudinal axis of the rail, said female element being disposed along and in an extension of the bottom and part of said lateral walls of said V-shaped guide element, wherein the seat comprises at least two lateral pins which extend in a direction perpendicular to the longitudinal direction of the rail, each pin being slidably mounted by means of a shoe in a rail, wherein the shoe includes a cavity for each lateral pin and defines in the immediate vicinity of said cavity a divergent guide region comprising a bottom and two walls, the cavity being located along and in an extension of the bottom and an adjacent part of said two walls.

* * * * *